United States Patent [19]
Yamanaka

[11] 3,956,763
[45] May 11, 1976

[54] FILM SENSITIVITY SETTING DEVICE
[75] Inventor: Akira Yamanaka, Sakai, Japan
[73] Assignee: Minolta Camera Kabushiki Kaisha, Japan
[22] Filed: May 21, 1975
[21] Appl. No.: 579,573

[30] Foreign Application Priority Data
May 25, 1974 Japan.............................. 49-59903

[52] U.S. Cl................................. 354/289; 354/58
[51] Int. Cl.²........................................ G03B 17/00
[58] Field of Search.................. 354/28, 37, 41, 58, 354/289

[56] References Cited
UNITED STATES PATENTS

| | | | |
|---|---|---|---|
| 2,976,788 | 3/1961 | Rentschler........................... | 354/58 |
| 3,183,807 | 5/1965 | Steisslinger.......................... | 354/58 |
| 3,303,765 | 2/1967 | Jakob et al. ......................... | 354/58 |
| 3,505,942 | 4/1970 | Ort...................................... | 354/289 |
| 3,668,993 | 6/1972 | Kurie .................................. | 354/289 |
| 3,742,824 | 7/1973 | Veda et al. .......................... | 354/289 |
| 3,839,723 | 10/1974 | Uno ..................................... | 354/37 |
| 3,843,249 | 10/1974 | Kitaura................................ | 354/289 |

Primary Examiner—L. T. Hix
Assistant Examiner—Russell E. Adams, Jr.
Attorney, Agent, or Firm—Watson, Cole, Grindle & Watson

[57] ABSTRACT

A film sensitivity setting device is provided for adjusting an automatic exposure control device of a camera in order to intentionally cause over- or underexposure. The setting device includes a manually operable ring which is rotatable for varying the resistance value of the exposure control device as a function of its position, a locking member integrally rotatable with the manually operable ring, and a locking mechanism for locking the locking member at every position corresponding to a set film sensitivity value. A manually operable intermediate member couples the manually operable ring with the locking member so that they rotate together and disengage from the locking member, when operated, to permit the manually operable ring to move independently of the locking member for enabling an over- or under-exposure adjustment.

15 Claims, 9 Drawing Figures

FILM SENSITIVITY SETTING DEVICE

BACKGROUND OF THE INVENTION

The present invention relates to a film sensitivity setting device for use in a photographic camera.

More particularly, the present invention concerns a device for enabling an automatic exposure control device of the camera to be adjusted so that exposure is carried out during a condition deviated from a proper one, i.e. over- or under-exposure is intentionally caused.

During actual photographing, there occasionally arises a need wherein it is desired to cause over- or under-exposure with respect to a proper exposure which is effected by an automatic exposure control device. In such cases, the setting of the film sensitivity may be readjusted to cause the desired over- or under-exposure. This adjustment for the intentional deviation of the exposure condition should be carried out with the set film sensitivity value being preserved in some form. For this purpose, one known device includes two knobs of concentrically overlaying construction, with one of the two being a film sensitivity setting knob and the other being a knob for intentional over- or under-exposure. If a film sensitivity is to be set, the two knobs are integrally rotated. When over- or under-exposure is desired, the knob provided for this purpose, i.e., the deviation knob, is depressed or pulled upwardly, so as to be disengaged from the film sensitivity setting knob, thereby enabling the deviation knob to be rotated relative to the film-sensitivity setting knob. While such a construction may appear to be convenient for operation, in practice, it is extremely difficult for the operator to turn the knob, due to the need for depressing or pulling the knob upwardly. In such a device, the film sensitivity setting knob has no locking mechanism, which often results in an erroneous operation, i.e., the film-sensitivity setting knob tends to inadvertently follow the rotation of the exposure deviation setting knob.

SUMMARY OF THE INVENTION

An object of the present invention is to provide a device for enabling the exposure to be intentionally deviated so as to set an under- or over-exposure condition without the drawbacks of previously known devices such as described above.

Another object of the present invention is to provide a device for intentionally causing an under- or over-exposure condition, in which a single knob is utilized for the dual purpose of both setting the film sensitivity value as well as causing the intentional deviation.

In order to accomplish these objectives, in accordance with the present invention, only a single knob is used for setting a film sensitivity as well as for intentionally causing a deviation in exposure, and the switching from the film sensitivity setting to the intentional setting of the exposure deviation is caused by pushing against a projecting piece which normally projects from the knob.

This renders the operation simple, as compared with the device of the prior art, in which a knob needs to be rotated while being depressed or pulled upwardly in the axial direction. With the additional utilization of a locking mechanism in conjunction with the film-sensitivity setting member, any risk of the film sensitivity setting being inadvertently changed from its set value is substantially avoided.

BRIEF DESCRIPTION OF THE DRAWINGS

FIG. 1b is an exploded perspective view of a portion of the device shown in FIG. 1a.

DESCRIPTION OF THE PREFERRED EMBODIMENT

Figure 1A:
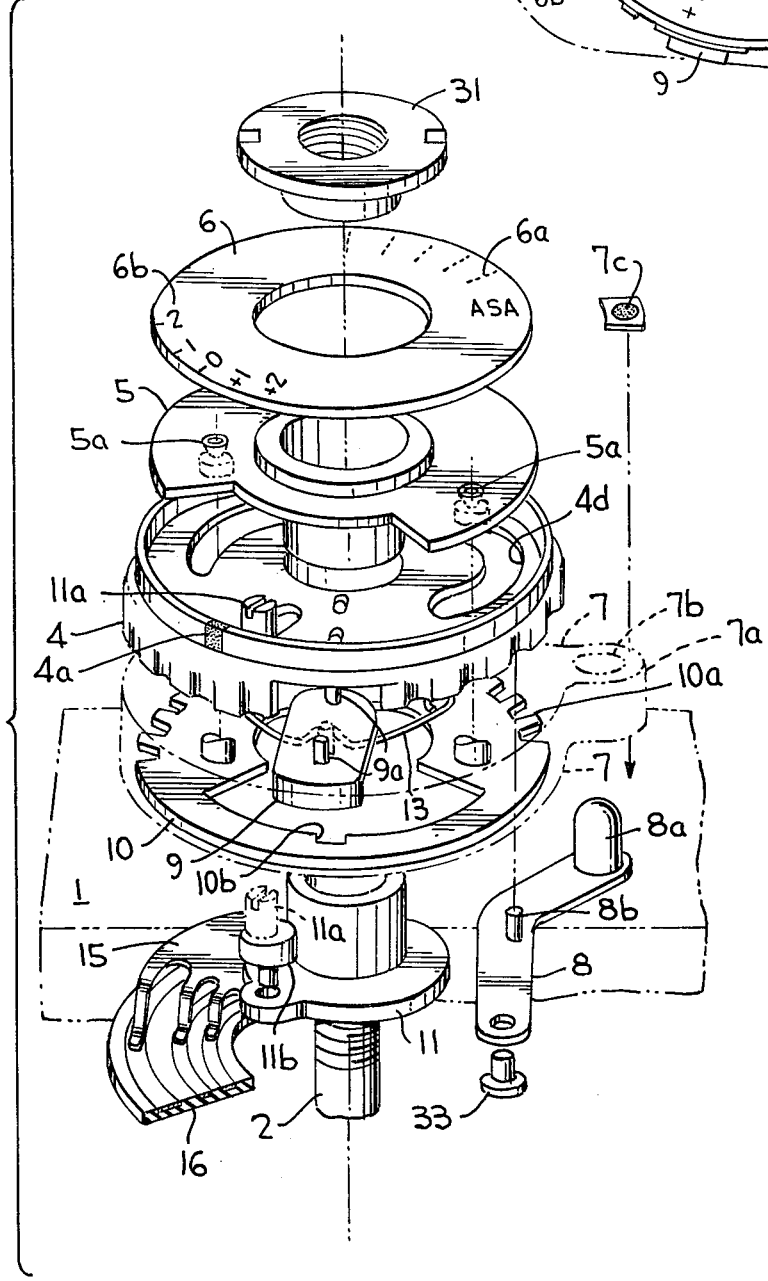
FIG. 1a is an exploded perspective view of a film sensitivity setting device according to the present invention.

As shown in FIG. 1a, a shaft 2 is fixedly mounted on a camera body 1, on which the film sensitivity setting device of the present invention is rotatably mounted.

The film sensitivity setting device is coupled with an exposure control circuit (not shown) in a conventional manner. The device of the present invention is primarily adapted for utilization in conjunction with an automatic exposure control, either of an electronic shutter speed or an automatic diaphragm setting type. This film sensitivity setting device will be described below.

A slide resistance, or rheostat, disc 16 is used for setting a film sensitivity value in an exposure control circuit of the camera. A brush 15 of slide rheostat 16 is supported by a disc 11 which is loosely mounted on shaft 2. An upright pin 11a is provided on the surface of disc 11 in engagement with a radially extending slot 4b located in a knob 4, so that disc 11 may be rotated by turning knob 4. A locking disc 10 for locking a film sensitivity setting disc 5 is disposed between knob 4 and disc 11 and is connected by pins 5a to disc 5, which disc is loosely mounted on stationary shaft 2 above knob 4. Although knob 4 is located between film sensitivity setting disc 5 and locking disc 10, since pins 5a of disc 5 are movably located in a circumferentially extending slot 4d in knob 4, knob 4 and disc 5 are capable of mutually independent rotation.

Film sensitivity setting disc 5 and locking disc 10 are concealed when assembled, since the former is entirely located within the circumferentially built-up edge of the upper surface of knob 4 and the latter is located in the recessed undersurface of knob 4, which has a skirt-type form. The boss of film sensitivity setting disc 5 loosely receives the boss of disc 11 and in turn is loosely fitted in the central hole of knob 4. A dial plate 6 is mounted on the upper surface of film sensitivity setting disc 5. On the upper surface of the dial plate, there are provided film sensitivity graduations 6a and graduations 6b indicative of intentional exposure deviations. Stopper 31 is threaded at the top of shaft 2, so that the assembly of the device will be secured on shaft 2.

Figure 1B:
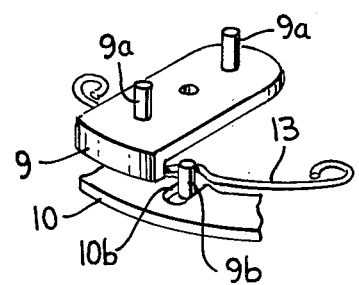

Dial plate 6, film sensitivity setting disc 5 and lock disc 10 are integrally held in engagement with each other, while knob 4 is capable of moving independent of these members. A projecting piece 9 is disposed between knob 4 and locking disc 10 within the cut-out provided in the recessed under-surface of knob 4. Projecting piece 9 serves as a coupling member so as to engage or disengage the integral disc assembly including film sensitivity setting disc 5 with or from knob 4. Projecting piece 9 has on its upper surface two upright pins 9a, both of which engage in radially extending guide slots 4c provided in knob 4, thereby enabling piece 9 to move radially with respect to the knob. Projecting piece 9 is normally urged outwardly from knob 4 under the bias of a spring 13 whose opposite ends are held on the undersurface of knob 4, as best seen in FIG. 1b. In this manner, the outer end of projecting piece 9 normally projects from the outer periphery of knob 4. Projecting piece 9 has a downwardly projecting pin 9b which is normally maintained in engagement with a cut-out 10b provided in the arcuate wall of a sector-shaped hole in knob 4, and thus engagement between knob 4 and the integral disc assembly is established. In order to release this engagement, it suffices to push projecting piece 9 by a finger towards the center of knob 4, thereby causing pin 9b to be moved out of cut-out 10b.

Figure 2:
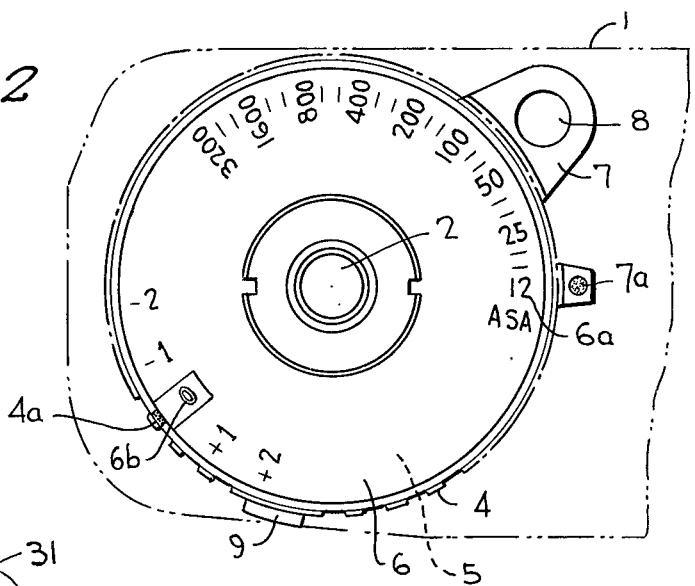
FIG. 2 is a plan view of the device shown in FIG. 1.

When projecting piece 9 takes a position, in which its pin 9b engages cut-out 10b in lock disc 10, an index 4a located on the outer periphery of knob 4 will be maintained in coincidence with the figure 0 of intentional exposure setting graduations 6b provided on dial plate 6. As long as this situation is maintained, if knob 4 is turned, then dial plate 6 will be rotated along with the knob, whereby a desired value of the film-sensitivity indicating graduations 6a is aligned with an indicia 7c, as shown in FIG. 2. At the same time, brush 15 changes its position on slide rheostat 16 in conjunction with the rotation of knob 4.

Figure 3:
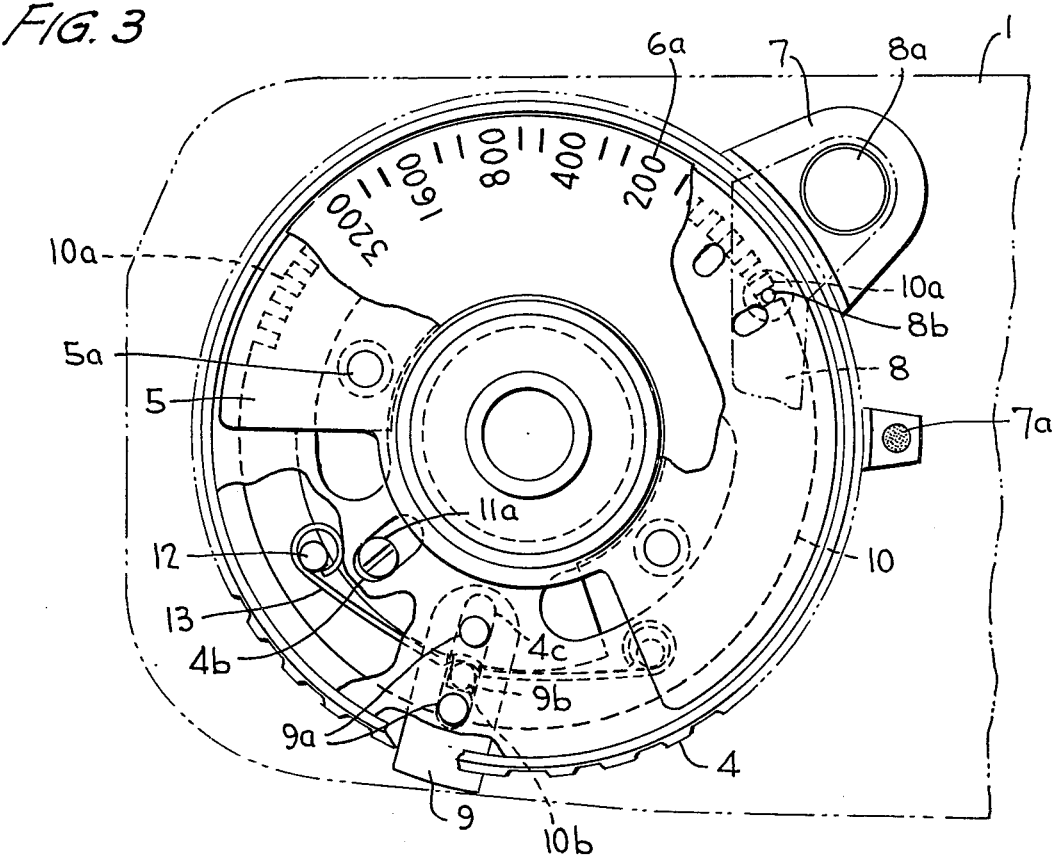
FIG. 3 is the plan view of FIG. 2 with a portion being partly broken away.

As shown in FIGS. 1a and 3, a series of indexing cuts 10a are provided in part of the circumference of lock disc 10, with their pitches being coincident with the graduations of film sensitivity indicating graduations 6a. A leaf spring 8 is secured to the inner wall of a cover 7, which is fixedly mounted on camera body 1, and has an upright pin 8b, which engages the series of cuts 10a, thereby maintaining film sensitivity setting disc 5 is a locked state. Leaf spring 8 is in the form of an inverted V shape and is attached to the inner wall of cover 7, with a button 8a on its free end fitting through an opening 7b in a projection 7a of cover 7, which projects outwardly of the knob from below. Thus, button 8a provided on the free end of leaf spring 8 is visible from the outside when assembled. If button 8a is depressed by a finger, then the engagement between locking disc 10 and upright pin 8b on leaf spring 8 is released and the film sensitivity setting can be effected. Upon the termination of the film sensitivity setting operation, the finger is released from button 8a, whereby film sensitivity setting disc 5 is locked at its set position.

Where it is desired to set the device for normal photography, the figure 0 of graduations 6b is maintained in registry with index 4a on knob 4, and button 8a is depressed by a finger and knob 4 is rotated until index 4a is moved into registry with a selected one of graduations 6a. Subsequently, when it is desired to set the device for an over- or under-exposure, knob 4 is softly held by the fingers of an operator, with his thumb contacting projecting piece 9, and then piece 9 is pushed inwardly. In this manner, the engagement between know 4 and locking disc 10 is released, and knob 4 is free to be turned, because locking disc 10 is maintained in a condition locked by button 8a which upon being released returns to its locked position. Knob 4 is then turned until index 4a coincides with a desired figure of graduations 6b, since dial plate 6 which is integral with the locking disc 10 remains stationary. Since knob 4 and brush 15 of the slide rheostat are usually maintained in engagement with each other, the brush will be displaced from its normal position to an over- or under-exposure position, due to the rotation of knob 4.

Pin 11a is slightly eccentric with respect to the center of its base 11b through which pin 11a is mounted on disc 11, and is provided with a diametrically extending groove in its top end face for enabling fine adjustment upon assembly of the device. If dial plate 6 is removed from shaft 2, the top end face of pin 11a will be seen through a sector-shaped cut in film sensitivity setting disc 5. If pin 11a is turned by means of a screw driver, then the fine adjustment for a position of knob 4 relative to brush 15 is achieved.

Figure 4:
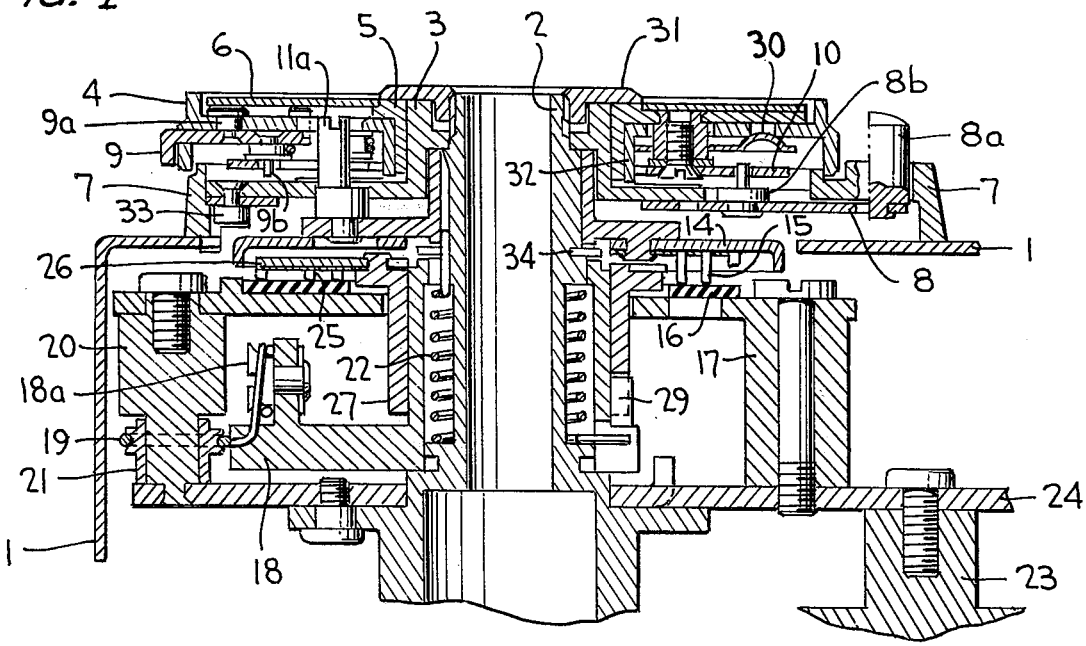
FIG. 4 is a longitudinal cross-sectional side view of the device shown in FIG. 1.
Figure 5:
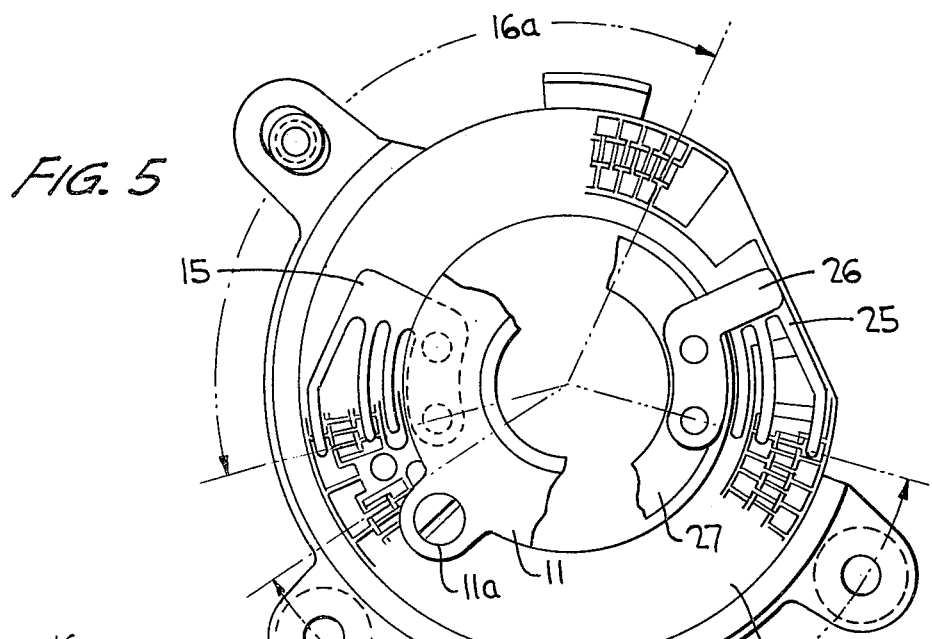
FIG. 5 is a plan view illustrating the slide resistance of the device shown in FIG. 1.
Figure 6:
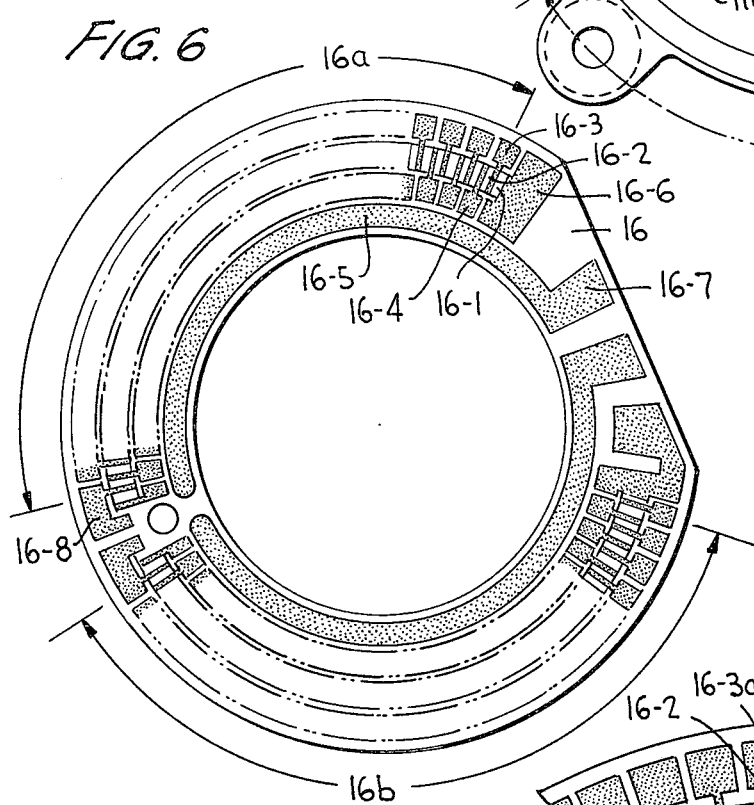
FIG. 6 is an illustration of the pattern of the resistance material of the slide resistance shown in FIG. 5.

As shown in FIG. 4, a leaf spring 30 is used for actuating a click stop which is disposed between the undersurface of knob 4 and locking disc 10. A cover plate 14 integral with disc 11 serves as a dust guard for preventing the entering of dust into the device from the surroundings of disc 11. A spring washer 32 prevents any looseness between film sensitivity setting disc 5 and knob 4, as well as also serving as an additional dust guard for preventing the entering of dust into the device from the surroundings of pin 11a.

Slide rheostat plate 16 will now be described in greater detail below with reference to the exemplary embodiment shown in FIGS. 5 through 8.

Slide rheostat plate 16 has two resistor patterns 16a and 16b on its upper surface. Resistor pattern 16a is used for setting a film sensitivity value, while pattern 16b is used for setting a diaphragm value in an exposure control circuit. A brush 25 interconnected with a diaphragm mechanism (not shown) slides in contact relationship with resistor pattern 16b. Each of the resistor patterns consists of finely divided plural resistor elements 16-1, 16-2, . . . 16-8, which are arranged on the base plate of rheostat 16 by means of vacuum evaporation, etching, spattering technique or the like. An outer tap electrode portion 16-3 leading from the resistor element 16-1 through an intermediate conductor 16-3a is to be in contact with a contact piece 15a of brush 15. An inner tap electrode portion 16-4 leading from resistor element 16-2 through an intermediate conductor 16-4a is to be in contact with a contacting piece 15b of brush 15. Likewise, respective resistor elements are electrically connected via adjoining intermediate conductors to an outer or inner tap alternately. Contacting piece 15c of brush 15 slides on an electrically conductive portion 16-5. The tap portions are so arranged that each outer tap portion angularly overlaps portions of the two inner tap portions which lead from resistor elements disposed on both sides of a resistor element connected to the outer tap, and vice versa. Respective resistor elements arranged in juxtaposed relation to one another are connected in series with each other by means of intermediate conductors 16-3a and 16-4a, and the resistance value, which is a sum of the resistance values of the resistance elements which are between terminal 16-6 and contact portion 15a or 15b of the brush, changes sequentially but progressively with sliding movement of contact portions 15a and 15b.

Figure 7:
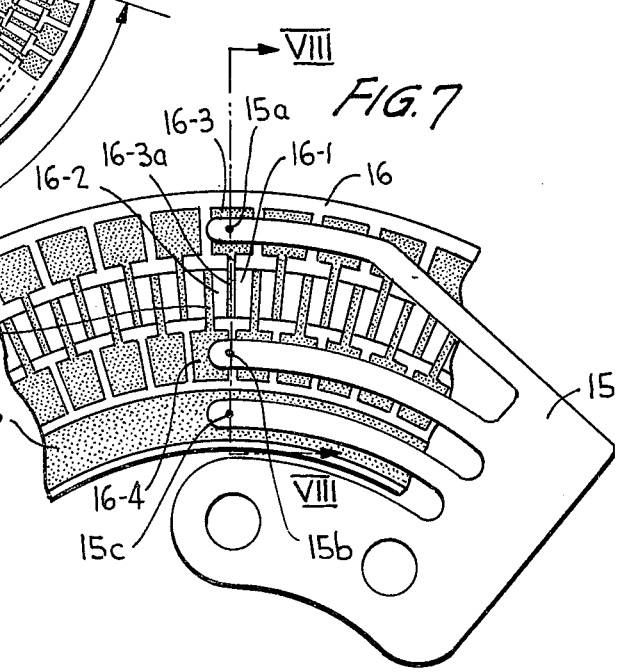
FIG. 7 is a fragmentary enlarged view of the slide resistance.
Figure 8:
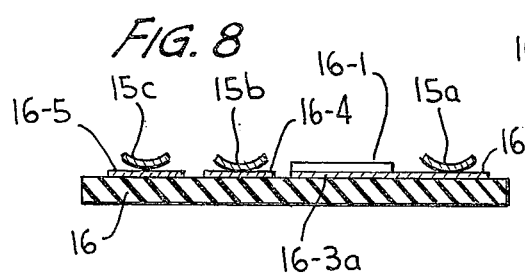
FIG. 8 is a sectional view taken along lines VIII — VIII of FIG. 7.

Referring to FIGS. 7 and 8, brush contacting pieces 15a, 15b and 15c are disposed in alignment along a radial line e.g. lines VIII — VIII. The group of contacting pieces and tap electrodes are so arranged on respective resistor patterns that the contacting piece 15b alone will be on a mid non-conductive position between tap electrodes, as shown in FIG. 8, when contacting piece 15a is at the center of a tap electrode.

Turning back to FIG. 4, an interlocking ring 18 is rotatably mounted on shaft 2 and linked with the diaphragm mechanism through an interlocking thread 19 so as to be rotated when diaphragm setting member (not shown) is operated. An intermediate pulley 21 for guiding interlocking thread 19 is wound around pulley 18a for adjustment of the positional relation between the diaphragm setting member and interlocking ring 18. Interlocking ring 18 is interconnected through a clutch 29 with a cylindrical carrier 27 carrying brush 25 so as to rotate carrier 27 and change the position of brush 25 whereby the resistance value of pattern resistor 16b will be changed in accordance with the diaphragm setting. A brush holder 26 mounted on carrier 27 serves to prevent excessive deflection of brush 25. A coil spring 22 is adapted to urge interlocking ring 18 to rotate in a clockwise direction towards its home position. A baseplate 24 is fixed with a screw on a bush 23 of camera body 1 for holding slide rheostat plate 16 and shaft 2. A nut 31 serves to prevent underlying elements from getting off upwards. A pin 33 fixes a leaf spring 8 on an intermidiate spacer 3 which is disposed between nut 31 and cover 7 to ascertain the positions of mechanical components.

It is noted that the above description and the accompanying drawings are provided merely to present exemplary embodiments of the present invention and that additional modifications of such embodiments are possible within the scope of this invention without deviating from the spirit thereof.

What is claimed is:

1. A film sensitivity setting device for use in a photographic camera of the type having an automatic exposure control device to which a signal representative of film sensitivity is provided by the setting device, the setting device comprising:
   a member manually operable for setting a film sensitivity value;
   a lock member;
   coupling means for integrally coupling said manual member with said lock member so that said manual and lock members move together as an integral unit, said coupling means being normally engaged with said lock member for effecting such coupling, and said coupling means being disengaged by manual operation from said lock member for enabling said manual member to move independently of said lock member;
   means for locking said lock member at each position corresponding to a film sensitivity value to be set by said manual member;
   means for releasing said locking means to permit movement of said lock member together with said manual member; and,
   an indicating member having at least one first indicia and said manual member having at least one indicia disposed for cooperating with said first indicia for indicating a derivation of exposure in coordination with the movement of said manual member relative to said lock member.

2. An apparatus as defined in claim 1, further comprising variable resistor means including a resistance material and a brush arranged to be in sliding engagement with said resistance material, said variable resistor means being operatively coupled with said manual member so that relative movement between said resistance material and said brush may be caused by movement of said manual member.

3. An apparatus as defined in claim 2, wherein said indicating member is interlocked with said lock member to move in coordination with the movement of said lock member and has at least one second indicia thereon and said camera has at least one fixed indicia disposed for cooperating with said second indicia on said indicating member for indicating a set film sensitivity as a function of the position of said lock member.

4. An apparatus as defined in claim 1, wherein said camera includes a fixed shaft mounted thereon, said manual member is formed by a first disc plate and a ring integrally coupled with said disc plate at its periphery, and said lock member is formed by a second disc plate having a plurality of notches at its periphery, said first and second disc plates are both rotatably mounted on said fixed shaft and said locking means locks said lock member by engagement with its notches.

5. An apparatus as defined in claim 4 wherein said locking means includes a lever having a pin secured thereon and being urged in a direction for said pin to engage one of said notches.

6. An apparatus as defined in claim 5, wherein said coupling means includes an intermediate plate interconnected with said first disc plate on said manual member such that said intermediate plate can move relative to said first disc plate in a radial direction but said intermediate plate can move in conjunction with said first disc plate with respect to a rotational direction, and said intermediate plate is engageable with said disc plate of said lock member for integrally coupling both said first and second disc plates.

7. An apparatus as defined in claim 6, wherein said intermediate plate is biased into engagement with said second disc plate of said lock member and is disposed so as to be capable of being manually pushed back against such biasing so as to be disengaged from said second disc plate.

8. An apparatus as defined in claim 7, wherein said variable resistor means includes a plurality of resistance elements arranged in a juxtaposed relationship with each other and electrically connected in series with each other, two series of taps each leading from a respective one of said resistance elements, said series taps each being arranged on an opposite side of said juxtaposed resistance elements such that a tap of one series overlaps portions of the taps of the other series that lead from said resistance element adjacent to said resistance element from which the tap of the first series leads.

9. A film sensitivity setting device for use in a photographic camera of the type having an automatic exposure control device to which a signal representative of film sensitivity is provided by the setting device, the setting device comprising:
   a film sensitivity setting member rotatable about a rotational axis thereof;
   a locking member capable of being locked in each of a plurality of positions corresponding to different film sensitivity setting values;

means for releasing said locking member from its locked position without varying the position of said film sensitivity setting member in a direction along the rotational axis of the film sensitivity setting member;

an exposure deviation setting member rotatable in conjunction with said film sensitivity setting member and engageable with said locking member for coupling said film sensitivity setting member and said locking member; and means for uncoupling said exposure deviation setting member and said film sensitivity setting member, thereby enabling said exposure deviation setting member and said film sensitivity setting member to be rotated in conjunction with each other by independent of said locking member.

10. An apparatus as defined in claim 9 further comprising a single knob projecting from the camera wherein said exposure deviation setting member and said film sensitivity setting member are both concentrically mounted about said single knob projecting from the camera, rotation of said knob causing both of said members to commonly rotate, and said exposure deviation member including an element normally projecting outwardly from said knob and being capable of being pushed inwardly so as to cause said film sensitivity setting member and said lock member to be uncoupled.

11. A film sensitivity setting device for use in a photographic camera of the type having an automatic exposure control device to which a signal representative of film sensitivity is provided by the setting device, the setting device comprising:

a member manually operable for setting a film sensitivity value;

an operating member;

coupling means for integrally coupling said manual member with said operating member so that said manual and operating members move together as an integral unit, said coupling means being so interconnected with said manual member as to be movable with said manual member in a direction in which said manual member moves in response to manual operation thereof, and being movable relative to said manual member in a direction approximately transverse to the direction of movement of said manual member;

means for interlocking said coupling means with said operating member for said integral coupling between said manual and operating members at their normal relative position;

biasing means for biasing said coupling means in the direction of relative movement of said coupling means with respect to said manual member for interlocking said coupling member with said operating member;

means for releasing said interlocking means in response to a manual operation for enabling said manual member to move independently of said operating member, and causing said coupling member to be brought into frictional contact with said operating member so as to keep said manual member at a position moved relative to said operating member when the manual operation of said coupling member is terminated;

means for locking said operating member at each position corresponding to a film sensitivity value to be set by said manual member; and means for releasing said locking means to permit movement of said operating member together with said manual member.

12. An apparatus as defined in claim 11, further comprising variable resistor means including a resistance material and a brush arranged to be in sliding engagement with said resistance material, said variable resistor means being operatively coupled with said manual member so that relative movement between said resistance material and said brush may be caused by movement of said manual member.

13. An apparatus as defined in claim 12, further comprising an indicating member interlocked with said operating member to move in coordination with the movement of said operating member and having at least one first indicia thereon; and wherein said camera has at least one fixed indicia disposed for cooperating with said indicia on said indicating member for indicating a set film sensitivity as a function of the position of said operating member.

14. A photographic camera of the type having an automatic exposure control device and a setting device for providing to the exposure control device a signal representative of the film sensitivity, the setting device comprising:

a film sensitivity setting member rotatable about a rotational axis thereof;

a locking member capable of being locked in each of a plurality of positions corresponding to different film sensitivity setting values;

means for releasing said locking member from its locked position without varying the position of said film sensitivity setting member in a direction along the rotational axis of the film sensitivity setting member;

an exposure deviation setting member rotatable in conjunction with said film sensitivity setting member and engageable with said locking member for coupling said film sensitivity setting member and said locking member; and means for uncoupling said exposure deviation setting member and said film sensitivity setting member, thereby enabling said exposure deviation setting member and said film sensitivity setting member to be rotated in conjunction with each other but independent of said locking member.

15. An apparatus as defined in claim 9 further comprising a single knob projecting from the camera wherein said exposure deviation setting member and said film sensitivity setting member are both concentrically mounted about said single knob projecting from the camera, rotation of said knob causing both of said members to commonly rotate, and said exposure deviation member including an element normally projecting outwardly from said knob and being capable of being pushed inwardly so as to cause said film sensitivity setting member and said lock member to be uncoupled.

* * * * *